US009804253B2

(12) United States Patent
Nijsure (10) Patent No.: US 9,804,253 B2
(45) Date of Patent: Oct. 31, 2017

(54) SYSTEM AND METHODS FOR NON-PARAMETRIC TECHNIQUE BASED GEOLOCATION AND COGNITIVE SENSOR ACTIVATION

(71) Applicant: ROCKWELL COLLINS INC, Cedar Rapids, IA (US)

(72) Inventor: Yogesh Anil Nijsure, Hyderabad (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 741 days.

(21) Appl. No.: 14/014,988

(22) Filed: Aug. 30, 2013

(65) Prior Publication Data

US 2015/0009072 A1 Jan. 8, 2015

(30) Foreign Application Priority Data

Jul. 8, 2013 (IN) .......................... 2039/DEL/2013

(51) Int. Cl.
*G01S 5/02* (2010.01)
*G01S 5/28* (2006.01)

(52) U.S. Cl.
CPC .......... *G01S 5/0215* (2013.01); *G01S 5/0278* (2013.01); *G01S 5/28* (2013.01)

(58) Field of Classification Search
CPC .... H04W 4/028; G01S 5/0215; G01S 5/0278; G01S 5/28
USPC ..................................... 340/539.22; 342/417
See application file for complete search history.

(56) References Cited

U.S. PATENT DOCUMENTS

| 5,973,643 | A  | * | 10/1999 | Hawkes .................. | G01S 1/045 342/457 |
| 6,407,703 | B1 |   | 6/2002  | Minter et al. | |
| 7,675,414 | B2 | * | 3/2010  | Ray .................... | H04M 1/72569 340/506 |
| 9,288,630 | B2 | * | 3/2016  | Raman .................. | H04W 4/028 |

(Continued)

OTHER PUBLICATIONS

Blackwell, D., et al., Ferguson Distributions Via Polya Urn Schemes, The Annals of Statistics, vol. 1, No. 2, Mar. 1993, pp. 353-355.

(Continued)

*Primary Examiner* — Frank J McGue
(74) *Attorney, Agent, or Firm* — Donna P. Suchy; Daniel M. Barbieri (57) ABSTRACT

The present invention relates to a geolocation system and method for a multi-path environment. The geolocation system comprises one or more emitters (201a . . . 201n), one or more sensors (202a . . . 202n) comprising at least one processor. A first processor (204) estimates angle of arrival (AOA) and time of arrival (TOA) from the signals received from said one or more emitters (201a . . . 201n). A second processor (205) determines clusters based on the (AOA) and (TOA) data. The system also comprises a central node (207) in communication with at least one sensor (202a . . . 202n) and configured to estimate geolocation of one or more emitters (201a . . . 201n) wherein, said second processor (205) clusters data for the one or more emitters (201a . . . 201n) by executing a non-parametric Bayesian technique and said central node (207) utilizes hybrid angle of arrival-time difference of arrival (AOA-TDOA) technique to determine geolocation of each of the emitters (201a . . . 201n).

10 Claims, 8 Drawing Sheets

(56) References Cited

U.S. PATENT DOCUMENTS

| | | | |
|---|---|---|---|
| 2003/0035518 A1* | 2/2003 | Fan | H04M 3/493 379/88.17 |
| 2005/0282540 A1* | 12/2005 | Motamedi | H04W 16/18 455/423 |
| 2007/0149216 A1* | 6/2007 | Misikangas | H04W 64/00 455/456.1 |
| 2008/0001735 A1* | 1/2008 | Tran | G06F 19/3418 340/539.22 |
| 2014/0062793 A1* | 3/2014 | AlSindi | G01S 5/0215 342/458 |
| 2014/0087754 A1* | 3/2014 | Siomina | H04W 4/02 455/456.1 |

OTHER PUBLICATIONS

Bouguila, N, et al., High-Dimensional Unsupervised Selection and Estimation of a Finite Generalized Dirichlet Mixture Model Based on Minimum Message Length, IEEE Computer Society, vol. 29, No. 10, Oct. 2007, pp. 1716-1731.

Du, HJ, et al., Simulation of Multi-Platform Geolocation Using a Hybrid TDOA/AOA Method, Technical Memorandum, Defense R&D Canada, Dec. 2004, Ottawa, Canada.

Escobar, M.D., et al., Bayesian Density Estimation and Inference Using Mixtures, J. Amer. Statistical Assoc, vol. 90, No. 430, Jun. 1995, pp. 577-588.

Fox, E., et al., Nonparametric Bayesian Methods for Large Scale Multi-Target Tracking, Fortieth Asilomar Conference on Signals, Systems and Computers, 2006. ACSSC 2006, pp. 2009-2013, 29 2006-Nov. 1, 2006.

Jackson, E., et al., Bayesian Unsupervised Signal Classification by Dirichlet Process Mixtures of Gaussian Processes, IEEE International Conference on Acoustics, Speech and Signal Processing, 2007, ICASSP 2007, vol. 3, pp. III-1077-III-1080, Apr. 2007.

Neal, RM, Markov Chain Sampling Methods for Dirichlet Process Mixture Models, Journal of Computational and Graphical Statistics, vol. 9, No. 2, Jun. 2000, pp. 249-265.

Nijsure, Y., et al., A Bayesian Nonparametric Approach to Tumor Detection Using UWB Imaging, IEEE International Conference on Ultra-Wideband (ICUWB), 2012, Sep. 2012.

Rasmussen, CE, et al., Modeling and Visualizing Uncertainty in Gene Expression Clusters Using Dirichlet Process Mixtures, IEEE, ACM Transactions on Computational Biology and Bioinformatics, vol. 6, No. 4, Oct.-Dec. 2009.

Saarnisaari, H., TLS-Esprit in a Time Delay Estimation, IEEE Vehicular Technology Conference, vol. 1, pp. 1619-1623, 1997.

Schmidt, RO, Multiple Emitter Location and Signal Parameter Estimation, IEEE Transactions on Antennas and Propagation, vol. AP-34, No. 3, pp. 276-280, Mar. 1986.

Sun, L., et al., SAR Image Segmentation Using GHM-Based Dirichlet Process Mixture Models, IEEE International Joint Conference on Computational Sciences and Optimization, 2009, CSO 2009, vol. 1, pp. 886-888, Apr. 2009.

Vanderveen, M, et al., Joint Angle and Delay Estimation (JADE) for Multipath Signals Arriving at an Antenna Array, IEEE Communications Letters, vol. 1, No. 1, Jan. 1997, pp. 12-14.

\* cited by examiner

SYSTEM AND METHODS FOR NON-PARAMETRIC TECHNIQUE BASED GEOLOCATION AND COGNITIVE SENSOR ACTIVATION

This application claims priority to Indian Application No. 2039/DEL/2013 entitled "SYSTEM AND METHODS FOR NON-PARAMETRIC TECHNIQUE BASED GEOLOCATION AND COGNITIVE SENSOR ACTIVATION" filed on Jul. 8, 2013, the content of which are incorporated herein by reference in its entirety.

FIELD OF THE INVENTION

The present invention relates to a system and methods for improved geolocation of radio emitters in a multi-path-rich wireless environment. Particularly, the invention relates to the use of a non-parametric Bayesian framework for clustering the Angle of Arrival (AOA) and Time of Arrival (TOA) data from multi-path components to facilitate radio emitter discrimination from the received signal in a harsh multi-path environment.

BACKGROUND OF THE INVENTION

Geolocation is the determination of the geographic location of an object through the use of electromagnetic signals, digital mapping, image processing techniques or other data fusion methods aided by electronic communication media. Originally developed for military use, wireless geolocation techniques now finds use in day-to-day commercial and personal activities, like geolocation of illegal transmitters, tracking down cellular phones and radio devices, etc. Conventional radio aided geolocation methods employ parameters of a received signal like the Angle of Arrival (AOA), Time of Arrival (TOA), Time Difference of Arrival (TDOA), Received Signal Strength (RSS) and Frequency Difference of Arrival (FDOA) etc. to determine the position of the radio emitter through triangulation.

Hybrid geolocation techniques employ a combination of two or more parameters like AOA-TDOA, RSS-TOA, TDOA-FDOA, RSS-TDOA etc. and offer a higher resolution in the estimation of the location of the radio emitter since they employ more than one parameter within the received signal. Such hybrid techniques can be implemented using mobile-based, sensor network based or radar based platforms.

However, even hybrid techniques, for example the AOA-TDOA estimation, pose unique challenges when used in multi-path environments like urban areas. In a typical multi-path environment, one or more sensors receive signals from a plurality of emitters from multiple directions and they estimate the AOA and the TOA information based on these received signals. This is achieved through processing the captured signal on the antenna array and using resolution techniques to estimate the data parameters. But, the urban area multi-path environment is highly time varying and heavily cluttered giving rise to significant multi-path fading. Invariably, there is an absence of a line-of-sight path between one or more emitters and a receiver, and the received signal from a particular emitter arrives at a sensor through multiple directions. In the absence of line-of-sight, the triangulation approach to position estimation does not work effectively. Consequently, most of the conventional and hybrid geolocation techniques fail to deliver an accurate estimate on the emitter location. Thus, a primary hurdle to localization or geolocation of radio emitters is the non-line-of-sight (NLOS) conditions between sensor and emitter.

In addition to the above mentioned problem on NLOS conditions and multi-path fading, the presence of multiple emitters operating on the same frequency spectrum leads to further complications. Due to the presence of multiple emitters it is vital for the sensor to identify the signal contribution of a single emitter within the mixture of signals received from several emitters. Only after such a discrimination of the emitters, can the geolocation techniques be used to estimate the locations of all the individual emitters. Accordingly, there also exists a unique challenge in identifying the contribution from each emitter in a multi-path environment.

Most prior art systems and techniques, in order to discriminate between distinct emitters, make a priori assumptions on the number of emitters present in the multi-path environment and the characteristics of the received signal. Subsequent to making a priori assumptions on the number of emitters, clustering techniques are employed on the multi-path data received at the sensors to determine contribution from the assumed emitters. Since there is a priori assumption on the number of emitters in a environment, the process of discriminating contribution from actual number of emitters is often not accurate. Therefore, the current geolocation methods and techniques are not effective in discriminating the correct number of emitters and consequently result in inaccurate or poor location tracking capability.

In view of the above, there exists a need for developing a robust clustering technique which will classify and attribute the received signal contributions to each individual emitter. Specifically, there is a need to develop an unsupervised mixture component analysis technique, which can be used to effectively estimate the parameters like AOA and TOA directly from the received mixture of multi-path data without relying upon any assumptions. This will facilitate a directly data-driven emitter discrimination approach in a multi-path environment.

Further, there exists a need to optimize the power consumption of a sensor network. The present invention aims at providing a cognitive sensor activation framework to selectively activate one or more sensors which are in proximity to the emitters, which results in power savings and noise reduction within the sensor network.

SUMMARY OF THE INVENTION

It is an objective of the present invention to provide an improved system for geolocation for one or more emitters in a multi-path environment like an urban area. The system according to present invention comprises one or more emitters and one or more sensors located in a multi-path environment. Each sensor comprises an antenna array for receiving multi-path signals from the emitters. The sensor further comprises of a transceiver on a processor board to send and receive signals. In addition, the sensor also has a field programmable gate array or FPGA board for processing the signals using a digital signal processor (DSP). A general purpose power PC or a general purpose processor (GPP) is embodied on the FPGA board and uses hardware description language (HDL) programming to perform the clustering technique of the present invention. The sensors are connected to a central node which is responsible for performing triangulation of one or more emitters and for performing data fusion within a cognitive sensor activation framework. The central node is operably connected to a cognitive sensor activation unit which tracks the position of one or more emitters and selectively activates the sensors in the vicinity of the emitter resulting in cognitive sensor activation for the geolocation system of the present invention.

In another objective, the present invention provides a method for high resolution multiple emitter geolocation in a multi-path environment by utilizing a non-parametric Bayesian clustering technique with a hybrid geolocation technique like AOA-TDOA. The exemplary method comprises the steps of receiving multi-path signals arising from one or more emitters on the antenna array at one or more sensors within the multi-path environment; determining the AOA and TOA data of each multi-path component; executing a non-parametric Bayesian technique to cluster or, in other words, correctly assigning the multi-path contributions to each emitter within the mixture of received signals arising from one or more emitter; transmitting said cluster to a central node by each of the sensors for further processing; estimating the TDOA profile and extracting the AOA data for each individual emitter from within the distinct clusters; and processing by the central node, the AOA-TDOA information for each of the discriminated emitters to perform a hybrid AOA-TDOA technique for geolocation. This method results in a robust clustering framework which accurately classifies and attributes the received signal contributions to each individual emitter in the multi-path environment.

In yet another objective, the present invention provides a method for selectively activating one or more sensors which are in the vicinity of the target in a multi-path environment. The method comprises the steps of obtaining a high resolution location estimate as described hereinabove; tracking by the cognitive sensor activation unit of the multiple mobile emitters; determining in real time the most optimum sensors to be activated; and activating only a small number of sensors in the vicinity of the target. This embodiment contributes towards power savings and reduces false alarms and noise contributions from the redundant nodes which are far away to the emitter, thereby resulting in a large power saving and noise reduction within the overall system.

To foregoing and other objects, features and advantages of the invention will be apparent from the following detailed description in conjunction with the drawings described hereinafter. It is to be appreciated that these drawings depict only typical embodiments of the invention and are therefore not to be considered limiting in its scope.

DETAILED DESCRIPTION OF THE INVENTION

Figure 1:
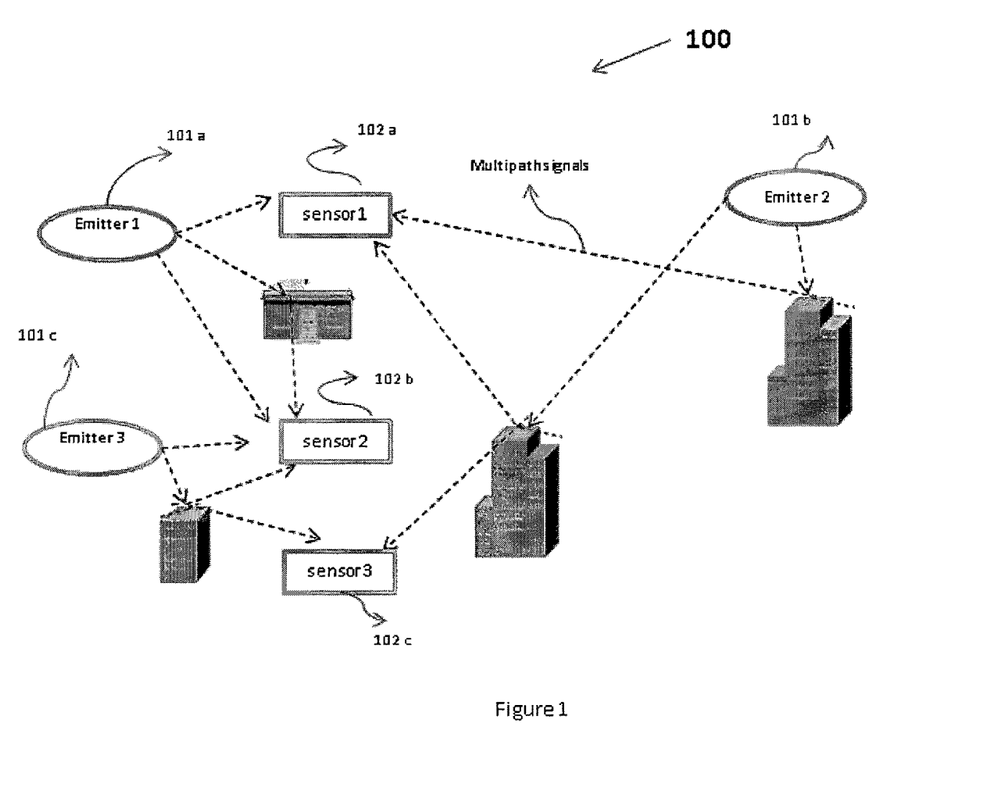
FIG. 1 illustrates a typical multi-path environment with plurality of emitters and sensors located in the environment.

FIG. 1 illustrates an exemplary multi-path environment (100) like an urban area with one or more emitters (101a, 101b, 101c) located at various sites of the environment. One or more sensors (102a, 102b, 102c) are deployed at various locations within the environment for sensing the signals received from the one or more emitters. Invariably, due to the urban topology there exists non-line-of-sight (NLOS) conditions and severe multi-path fading due to signal reflection from buildings, objects, walls, cars, etc. Due to the NLOS between the emitters and sensors, the signal from one or more emitters reaches the sensors from multiple directions after reflections from obstacles in the cluttered environment. This results in the sensors (102a, 102b, 102c) receiving multiple components of a signal transmitted by one or more emitters (101a, 101b, 101c).

Figure 2:
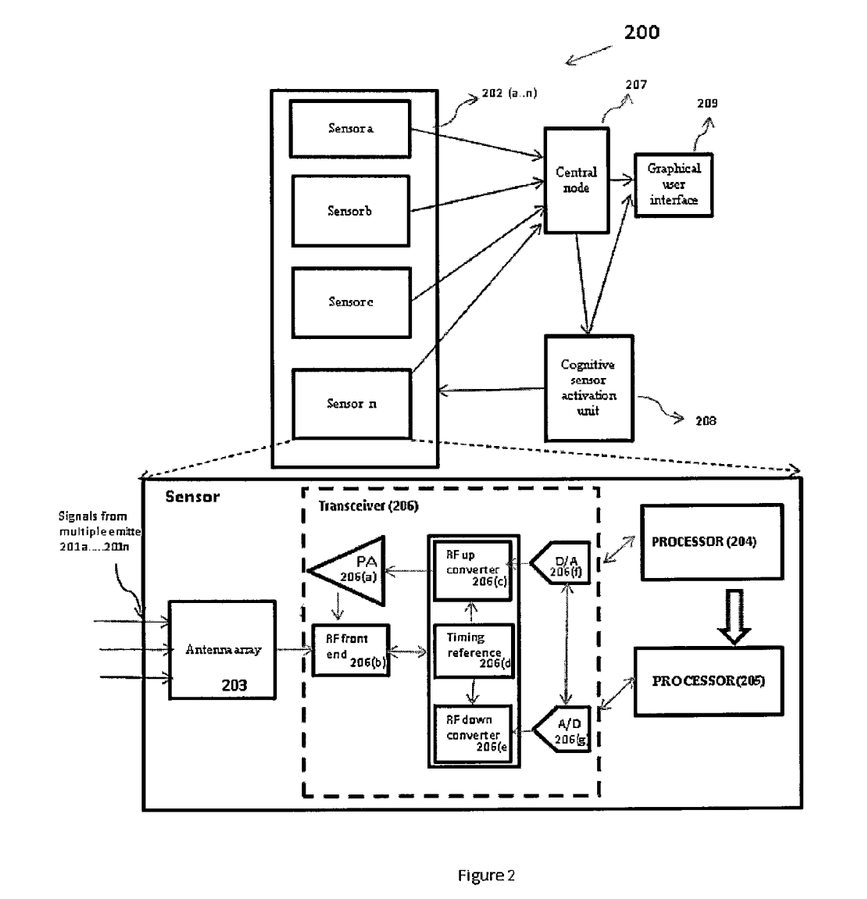
FIG. 2 illustrates a system for geolocation of plurality of emitters on a multi-path environment, according to an embodiment of the present invention.

Referring to FIG. 2, in a preferred embodiment, a sensor (202a ... 202n) comprises an antenna array (203) arranged to receive multi-path components from each of the emitters in the environment. The sensor further comprises a transceiver (206) to send and receive signals. The transceiver (206) further comprises other components to process the received signals including a power amplifier (206a), a radio frequency front end (206b) for receiving signals from the antenna array (203), a radio frequency up converter (206c), a radio frequency down converter (206e), a timing reference unit (206d), an analog to digital converter (206g) and a digital to analog converter (206f).

The sensor also has a field programmable gate array or FPGA board which may embody a digital signal processor (204) which performs the angle of arrival-time difference of arrival (AOA-TDOA) estimation. The sensor may further comprise a general purpose power PC or a general purpose processor (GPP) (205) for implementing a non-parametric Bayesian clustering technique according to an embodiment of the present invention using a hardware description language (HDL) programming. In an alternate embodiment, the clustering technique may be performed by the digital signal processor (204) which is also responsible for correctly estimating the number of emitters based on the AOA-TOA data. For example, assuming that z is a set of multi-path signals from one or more emitters received at the antenna array (203), if z consists of sequence of observations $z_1$ to $z_n$, then processor (204) estimates the TOA and AOA data from the down-converted signal received from the transceiver (206).

The sensor (202) is operably connected to a central node (207). In an alternate embodiment, the central node (207) may be located at a remote location and may be in wireless communication with the plurality of sensors (202a ... 202n). The central node (207) is further connected to a cognitive sensor activation unit (208) which may be configured to execute geolocation techniques for identifying emitter locations from the clusters of observations and TDOA profiles. For example, and as described in reference to FIG. 3, the transceiver (206) of sensor (202) transmits the cluster data and TDOA profile of observations to the central node (207). The central node (207) processes the data and provides the location details of the plurality of emitters of the environment. Utilizing the location prediction data obtained by the central node (207), the cognitive sensor activation unit (208) is configured to determine emitter location and activate one or more sensors (202a ... 202n) which are in proximity to the targeted emitter. The central node (207) and cognitive sensor activation unit (208) may further be connected to a graphical user interface (209) for visualizing cluster data and details of activated sensors in a multi-path environment. In an embodiment, said graphical user interface (209) can be installed on a remote location away from the environment.

Figure 3:
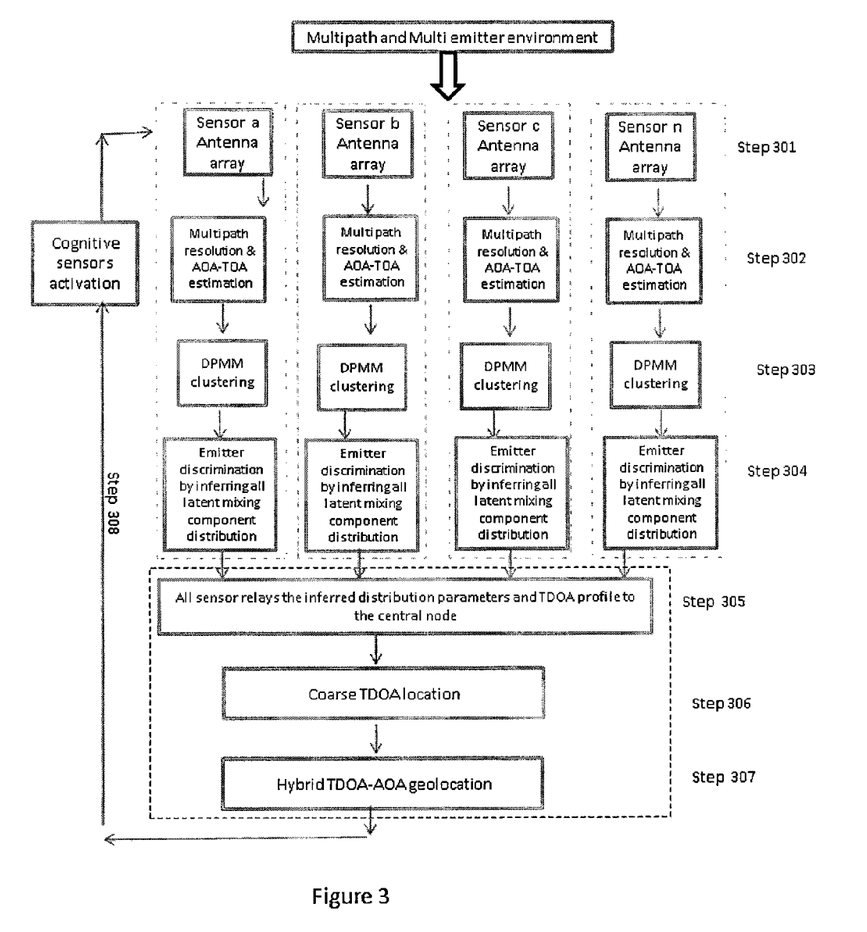
FIG. 3 illustrates the process of hybrid geolocation of emitters and a cognitive sensor activation framework using an exemplary non-parametric Bayesian technique according to an embodiment of the present invention.

FIG. 3 describes the process of geolocation of multiple emitters in a multi-path environment using a hybrid AOA-TDOA geolocation process aided by a non-parametric Bayesian technique of the present invention. In an exemplary embodiment described using the components of FIG. 2, the multi-path urban topology is spatially discretized into distinct Voronoi regions with the sensors constituting the Voronoi centers. The sensors collect the received signal data from multiple emitters. Specifically, as shown in Step 301, the signals from one or more emitters in the multi-path environment are received at the antenna array (203). The antenna array (203) provides information, such as RF signal, to the sensors (202a ... 202n) for further processing. In Step 302, the digital signal processor (204) determines the AOA and TOA of each of the multi-path signal by techniques such as Multiple Signal Classification (MUSIC), Joint Angle Delay Estimation (JADE) or through Estimation of Signal Parameters through Rotational Invariance (ESPRIT) used in conventional direction finding methods. In the exemplary embodiment, Step 302 comprises additional signal processing including wideband digital down conversion, windowing fast Fourier transform and signal detection (not shown) prior to performing AOA-TOA estimation. In this embodiment, the data derived from the multi-path signals may be modeled as a mixture of multivariate Gaussian distributions, with each emitter contributing a component to the mixture.

Next, in Step 303, the sensors (202a, ..., 202n) perform clustering individually to discriminate distinct emitter contributions within the AOA-TOA data obtained from processor (204). In the exemplary embodiment, in the general purpose processor (205), a non-parametric Bayesian clustering technique called Dirichlet Process Mixture Model (DPMM) based clustering of AOA-TOA data is employed for obtaining the actual number of emitters in a environment. The number of emitters and their received signal distribution parameters are unknown a priori, and are to be inferred directly from the data. Using a Dirichlet Process (DP) permits the assumption of a priori a countably infinite number of clusters, and to directly utilize the raw multi-path data in order to make an accurate estimate of the number of emitters without relying on any initial assumptions.

An exemplary DPMM technique for identifying the cluster of observations in accordance with an exemplary embodiment is illustrated hereinafter.

If z is a set of AOA-TOA components derived from multi-path components or observation set received at antenna array, AOA-TOA multi-path data at each sensor is processed by processor (204) to obtain sequence of data $Z_1, \ldots, Z_n$. Thus, for each $i=1, \ldots, n$, $z_i = \{\theta_i, \phi_i, \tau_i\}$, where $\theta_i$ is the azimuth angle data associated with a particular multi-path component of an emitter (multi-path component LOS or NLOS) contribution and $\phi_i$ is the corresponding elevation angle information and $\tau_i$ is the TOA of the multi-path component.

In the exemplary embodiment, it is assumed that $z_i$ has a multivariate Gaussian distribution with mean vector $\mu_i$ and covariance matrix $\sigma_i$. If $\psi_i = \{\mu_i, \sigma_i\}$ is the parameter of interest for data $z_i$, the goal will be to find the posterior distribution of $(\psi_1, \ldots, \psi_n)$ given the data $(z_1, \ldots, z_n)$. If we make sequence of observations $(z_1, \ldots, z_n)$, where for each $i=1, \ldots, n$, $z_i \sim F(\bullet|\psi_i)$, and $\psi_i \in \Psi$ is a parameter describing the observation distribution, employing a Dirichlet process of clustering the data using Gibbs sampling technique, this prior is chosen to be a stochastic process which leads to a model with very rich features. Specifically, the Dirichlet Process is a distribution over the space of all probability measures on $\Psi$. A random distribution G on $\Psi$ is then drawn from this distribution, and given G, the parameters $\Psi_i$, $i=1, \ldots, n$, are independent and identically distributed according to G. To define the Dirichlet Process, we first let $G_0$ be a probability distribution over $\Psi$, which represents our prior belief about a parameter, and $\alpha$ be a positive number that serves as a weight between our prior belief and information inferred from observed data. We say that G is distributed as a Dirichlet Process, denoted as $G \sim DP(\alpha, G_0)$, if for any finite measurable partition $A_1, \ldots, A_r$ of $\Psi$, we have $$(G(A_1), \ldots, G(A_r)) \sim Dir(\alpha G_0(A_1), \ldots, \alpha G_0(A_r)),$$

where $Dir(\bullet)$ is the Dirichlet distribution. From this definition, we see that the DP is a stochastic process. Thus, the DPMM has the following representation, $$G \sim DP(\alpha, G_0),$$

$$\psi_i | G \sim G,$$

$$z_i | \Psi_i \sim F(\bullet|\psi_i).$$

Let $\psi_{-i} = (\psi_1, \ldots, \psi_{i-1}, \psi_{i+1}, \ldots, \psi_n)$ be the vector of parameters excluding $\psi_i$. Assuming that all distributions have a density with respect to some dominating $\sigma$-finite measure and using the same symbols to denote the distribution as well as the density, the posterior distribution of $\psi_i$, conditioned on the data z and $\psi_{-i}$ is then given by $$p(\psi_i|\psi_{-i}, z_i) \propto F(z_i|\psi_i) p(\psi_i|\psi_{-i}), \quad (2)$$

since given $\psi_{-i}$, $\psi_i$ depends only on $z_i$. From the Blackwell-MacQueen Polya-Urn scheme, the conditional distribution of $\psi_i$ given $\psi_{-i}$ is $$p(\psi_i | \psi_{-i}) = \frac{\alpha}{\alpha + n - 1} G_0(\psi_i) + \frac{1}{\alpha + n - 1} \sum_{j \neq i} \delta_{\psi_j}(\psi_i), \quad (3)$$

where $\delta_\psi$ is the Dirac delta function at $\psi$. Thus the posterior distribution is given by $$p(\psi_i | \psi_{-i}, z_i) = \beta \alpha G_0(\psi_i) F(z_i|\psi_i) + \beta \sum_{j \neq i} F(z_i|\psi_j) \delta_{\psi_j}(\psi_j) \quad (4)$$

where $\beta = 1/(\alpha q_0 + \sum_{j \neq i} F(z_i|\psi_j))$ is a normalizing constant, and $$q_0 = \int G_0(\psi) F(z_i|\psi) d\psi \quad (5)$$

is the marginal density of $z_i$ at its realization. In order to evaluate the integral (5), we choose $G_0$ to be a conjugate prior to the Gaussian distribution $F(z_i|\psi_i)$. In this work, the Normal-Wishart distribution for $G_0$ is used. A Gibbs sampler can now be designed to obtain the posterior distribution of $\psi_i$ given all the data. Let $p_z(\psi_i|\psi_{-i})$ be the conditional distribution of $\psi_i$ given all the data z. We sample $\psi_i$ according to $$p_z(\psi | \psi_{-i}) = \begin{cases} \beta F(z_i | \psi_j), & \text{if } \psi = \psi_j, \\ \beta \alpha q_0 \xi(\psi | z_i), & \text{if } \psi \neq \psi_j, \forall j, \end{cases} \quad (6)$$

where $\xi(\psi | z_i) = G_0(\psi) F(z_i | \psi_i) / q_0$.

We initialize the Gibbs sampler by considering each data $z_i$ as being in its own set, with $\psi_i^{(0)} = z_i$. Subsequently the Gibbs sampling for the k th step is done in the following way.

Sample $\psi_1^k$ from $p_z(\bullet | \psi_2 = \psi_2^{(k-1)}, \psi_3 = \psi_3^{(k-1)}, \ldots, \psi_n = \psi_n^{(k-1)})$ Sample $\psi_2^k$ from $p_z(\bullet | \psi_1 = \psi_1^{(k)}, \psi_3 = \psi_3^{(k-1)}, \ldots, \psi_n = \psi_n^{(k-1)})$ Sample $\psi_n^k$ from $P_z(\bullet | \psi_1 = \psi_1^{(k)}, \psi_2 = \psi_2^{(k)}, \ldots, \psi_{n-1} = \psi_{n-1}^{(k)})$ The DPMM technique of the present invention detects the distinct components or clusters in the raw data without making any a priori assumptions about the number of emitters or any candidate locations.

Next, in Step 304, the sensors collaborate and evaluate the TDOA profiles for each emitter signals based on the clustered TOA in the previous step. Once a set of optimum AOA-TOA clusters is determined and TDOA profile is obtained at each node, the clusters and TDOA profile are then sent to the central node (207) for data fusion and further processing (Step 305). In Step 306, the central node (207) then establishes each emitter position based on the AOA-TDOA information received. This is done by, for example, evaluating a least square solution based on the TDOA data. This coarse TDOA estimate is then refined in Step 307 by a hybrid AOA-TDOA technique.

Figure 4:
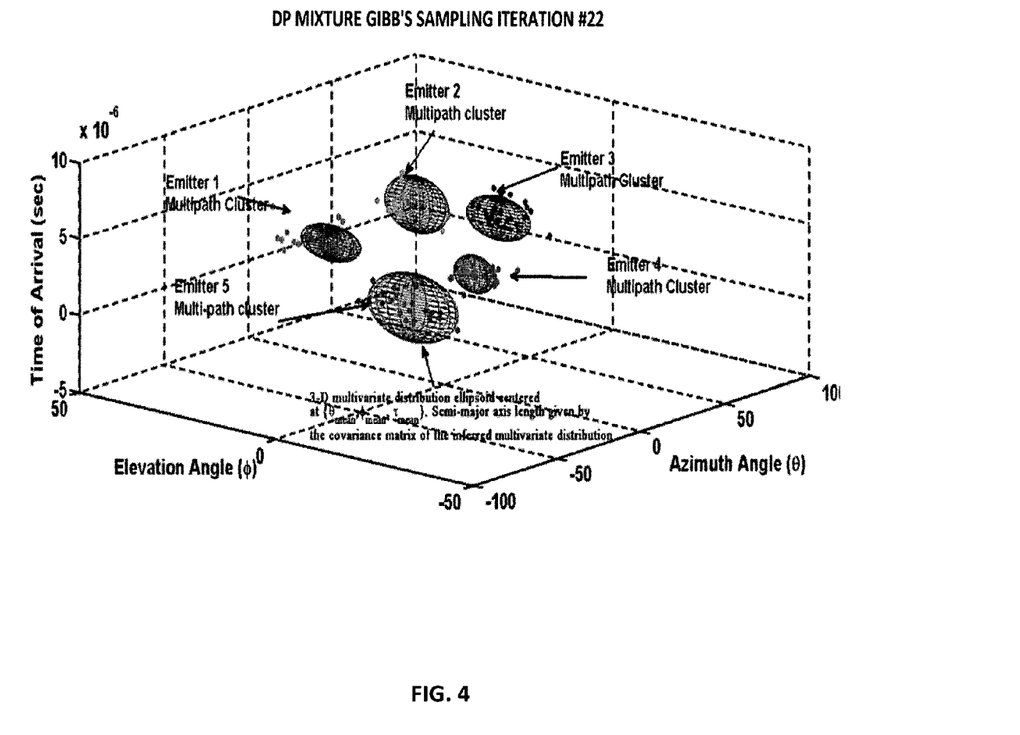
FIG. 4 shows the emitter discrimination capability of the proposed non-parametric Bayesian technique.

In an exemplary embodiment, the central node (207) executes the hybrid (AOA)-(TDOA) technique and Levenberg-Marquardt technique and utilizes the data $\theta_{mean}, \phi_{mean}, \tau_{mean}$, which are obtained from cluster of discriminated emitters determined using non-parametric Bayesian technique, preferably a Dirichlet Process Mixture Model (DPMM) technique, to achieve the geolocation of each of the emitters in a multipath environment. The inferred set of parameters $\Psi = \{\psi_1^k, \psi_2^k, \ldots, \psi_n^k\}$ is utilized to form hybrid geolocation estimate. As shown in FIG. 4, the underlying distributions are inferred. The ellipsoids represent the 3D multivariate distribution, centered at the mean vectors inferred from $\Psi$ and the length of semi-axes is determined by the covariance matrix estimated within $\Psi$. In the exemplary hybrid AOA-TDOA technique, said parameter estimates mean vectors of the 3D distribution and specifically, $\theta_{mean}, \theta_{mean}, \tau_{mean}$ inferred from $\Psi$ are used to achieve the geolocation of emitters.

Based on the above hybrid angle of arrival (AOA) and time difference of arrival (TDOA), the central node predicts the position of each of the emitter and in the next time instant by utilizing tracking technique like extended Kalman filtering, and then works out a sensor activation process in order to select the best sensors in the proximity of the emitter to be selected for sensing based on the Voronoi region discretization (Step 308). The Voronoi region discretization of the embodiment identifies the nearest sensor to the emitter node; for example if the emitter location falls within a Voronoi cell/region, then the nearest sensor is the sensor at the center of the Voronoi region. This property of placing the sensors at the centers of Voronoi cells helps to identify the nearest set of sensors around the target emitter.

Thus, in this exemplary approach we track the location of the emitter before trying to detect its presence. This track-before-detect approach conserves crucial sensor power and also contributes in reducing false alarms and noise contributions given by redundant and far away sensors. In an alternative approach, based on this position prediction the central node (207) activates the most optimum set of sensors and the whole process of discrimination and prediction is repeated. In an advantageous embodiment, feedback from the individual sensors (202a, . . . , 202n) to the central node (207) enables the central node to perceive the sensor node network and this cognition would help the sensor node unit to design adaptive beamforming, power and spectrum allocation strategies, to enhance the geolocation performance and mitigate interference and jamming.

In yet another advantageous embodiment, the cognitive sensor activation framework according to present invention enables to conserve the crucial sensor node transmission power and reduces false alarm and noise contributions if redundant sensors are activated in the next time instant.

FIG. 4 illustrates the emitter discrimination capability of the DPMM technique described in the present invention. The DPMM technique in the present invention infers the underlying latent mixing components distributions of the different clusters corresponding to multi-path data of distinct emitters. In the exemplary embodiment the DPMM technique is able to discriminate the contributions of 5 distinct emitters within just 22 iterations of Gibbs Sampling. The ellipsoids in FIG. 4 represent the multi-variate distributions over $\{\theta, \Phi, \tau\}$. These ellipsoids are centered at the inferred means $\{\theta_{mean}, \Phi_{mean}, \tau_{mean}\}$. The length of the semi-axes of the ellipse are given by the inferred covariance matrix of the multivariate distribution. Therefore, the Dirichlet process provides a very diffused model to accommodate a mixture of multivariate distributions and can thus offer unbounded complexity.

The DPMM technique of the present invention has several advantages as compared to known systems and methods. It makes the geolocation system adaptable by providing a unique machine learning approach to make inferences directly from the observed data, without having to resort to any intermediate parameters for estimation of the mixing components. Moreover it adapts its estimation mechanism on the fly in accordance with the observed data (by updating the posterior distribution with each observed data instance during Gibbs Sampling as shown previously).

Advantageously, the DPMM technique of the present invention is also very flexible as it presents a very diffused model which can accommodate higher dimensional data and provides a framework to perform unsupervised mixture component analysis without the need of any a priori information on the number of emitters or the mixing proportion of their AOA-TOA data. Processing data utilizing the DPMM technique reveals the underlying latent mixing components through an iterative procedure taking into account each data instance at a time through update of the posterior distribution. The clustering approach of the DPMM technique is also flexible in terms of accommodating higher dimensional data, for example as stated previously, emitter discrimination can be based on multivariate data (elevation angle, azimuth angle and TOA).

The DPMM technique described hereinabove can also accommodate further data parameters like received signal strength, frequency of arrival to facilitate a better clustering of mixing components. Unlike other approaches which take into account or need sensor-scene-specific information (scatterer layout, topology, maps), DPMM provides a very generic model which can be used to learn about any sensor node network under consideration.

Advantageously, the DPMM technique of the present invention enhances the emitter discrimination capability resulting in improved geolocation estimate for each emitter. For example, in the exemplary embodiment, an accuracy of approximately 20 m to 25 m in 3D could be achieved with TOA spread of 1 μsec and AOA spread of 15° in the multi-path components of different emitters in an urban topology of 2 km×2 km×2 km. The DPMM technique is robust and relies upon coarse TDOA estimate to aid the hybrid estimation and thus can handle worse AOA spreads (more than 20°) without affecting the geolocation accuracy.

Figure 5:
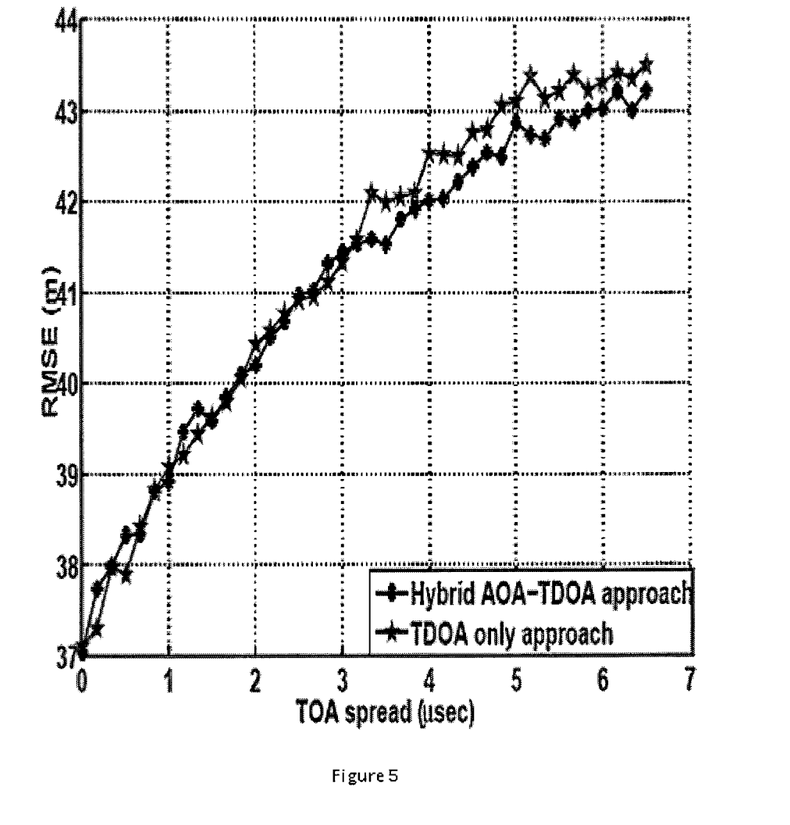
FIG. 5 shows the performance of the hybrid geolocation technique of the present invention in comparison to the TDOA only approach with TOA spread of 1 μsec.

FIG. 5, shows the performance of the DPMM technique of the present invention in comparison to the TDOA only approach known in prior art. The TOA spread is fixed at 1 μsec and each root mean squared error point is obtained by averaging over 100 realizations at each distinct value of AOA spread. As seen from this result, the performance of the hybrid scheme is better than the TDOA based approach for lower angular spreads.

Figure 6:
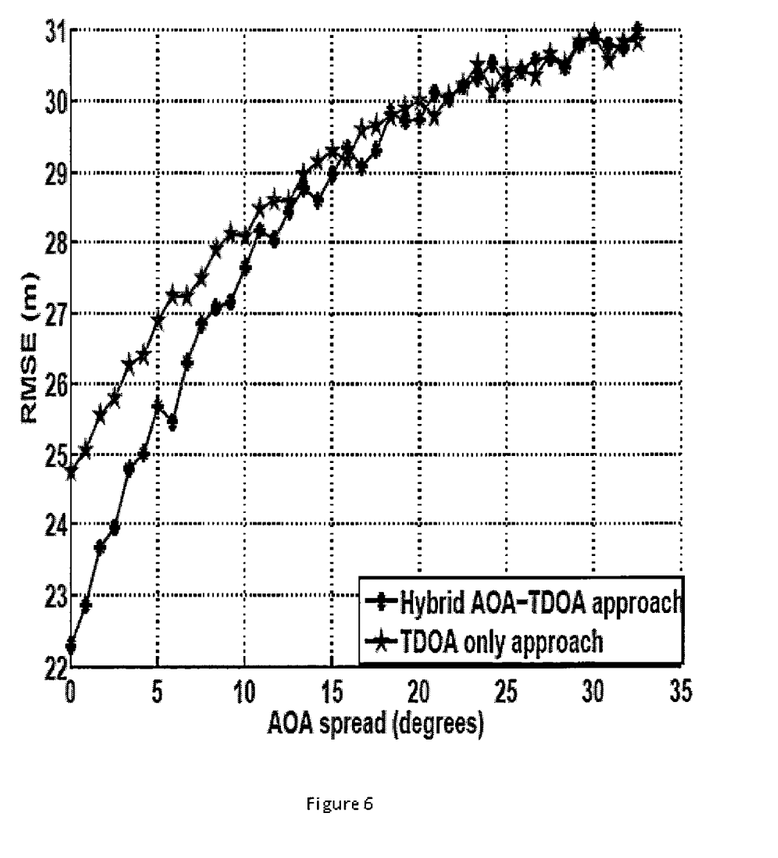
FIG. 6 shows the performance of the hybrid geolocation technique of the present invention in comparison to the TDOA only approach with AOA spread of 15°.

FIG. 6, shows the performance of the DPMM technique of the present invention in comparison to the TDOA only approach known in prior art. The AOA spread is fixed at 15° and each root mean squared error point is obtained by averaging over 100 realizations at each distinct value of TOA spread. As seen from this result, the performance of the hybrid scheme is better than the TDOA based approach for higher TOA spreads. Below TOA spread of 6 μsec both the approaches show the same performance degradation, however at TOA spreads more than 6 μsec the hybrid approach shows a slightly slow performance degradation.

Figure 7:
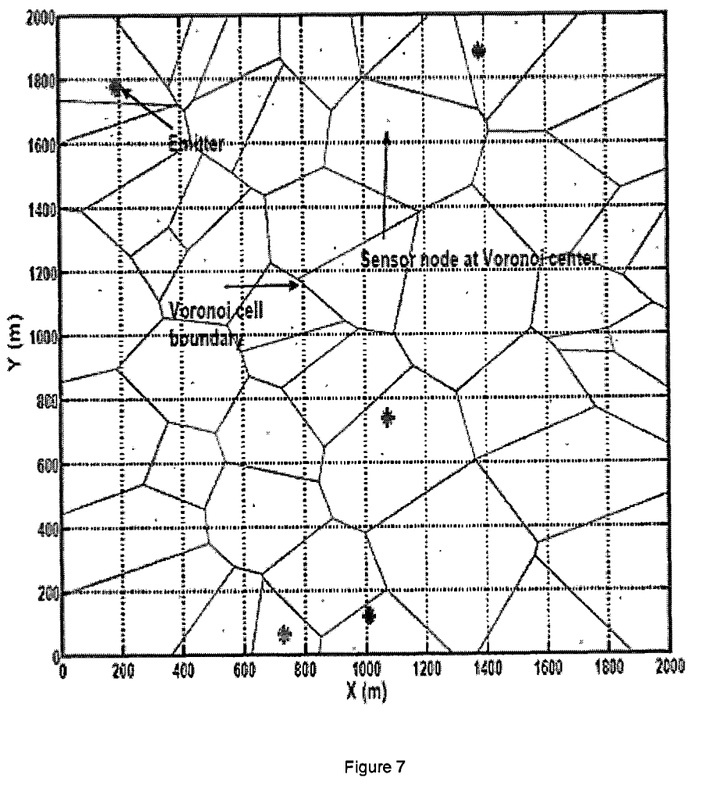
FIG. 7 represents an exemplary spatial discretization of an urban environment for cognitive sensor activation according to an embodiment of the present invention.

FIG. 7 represents the spatially discretized urban topology into distinct Voronoi regions. According to the cognitive sensor activation framework, the sensors which are in close proximity to the emitter are activated. In an embodiment, cognitive sensor node activation strategy utilizes the clustered AOA-TOA data obtained from non-parametric Bayesian technique. In this novel approach, accurate number of emitters are identified in a environment using non-parametric Bayesian technique namely DPMM technique, thereby improving the efficiency of the cognitive sensor activation process.

Figure 8:
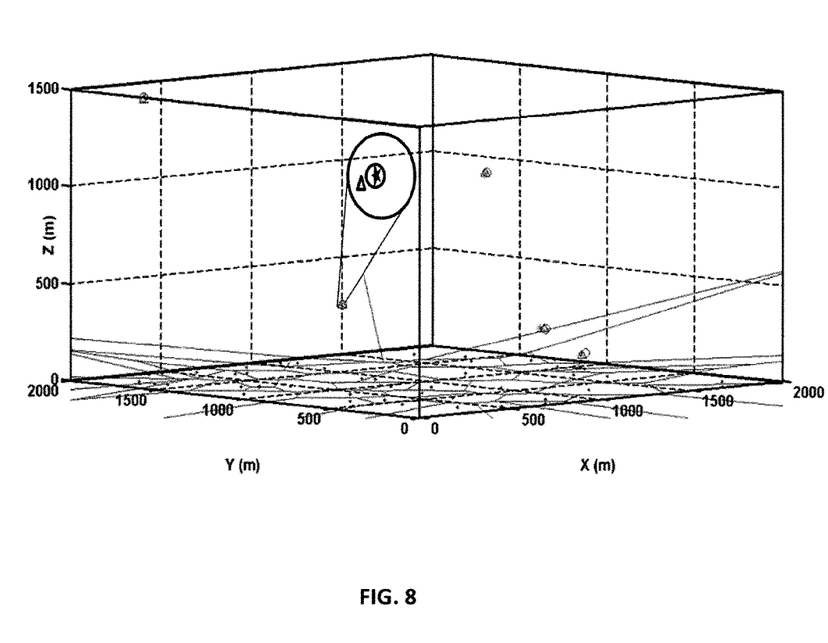
FIG. 8 represents an exemplary geolocation result of the hybrid AOA-TDOA technique according to the present invention in comparison to a TDOA only approach.

FIG. 8 represents an exemplary geolocation result of the hybrid AOA-TDOA scheme in comparison to TDOA only approach. The star denotes the actual emitter location, the triangle represents the TDOA estimate and the circle represents the hybrid estimate for the emitter location.

From the above it is evident that the cognitive sensor activation framework would activate only those sensor nodes which are in proximity to detected emitters thereby improving the working of cognitive sensor activation framework.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A geolocation system for a multi-path environment comprising:
    one or more emitters;
    one or more sensors comprising at least one processor;
    a first processor configured to estimate an angle of arrival (AOA) and a time of arrival (TOA) from the signals received from the one or more emitters;
    a second processor configured to determine clusters based on the AOA and TOA data received from said one or more emitters;
    a central node in communication with at least one sensor and configured to estimate geolocation and a next time instant position of the one or more emitters based on the determined clusters; and
    a cognitive sensor activation unit in communication with the central node, the cognitive sensor activation unit configured to selectively activate the one or more sensors to detect the corresponding one or more emitters based on the estimated geolocation and next time instant position of the one or more emitters;
    wherein said second processor clusters data for the one or more emitters in said multi-path environment by executing a non-parametric Bayesian technique; and
    said central node utilizes hybrid angle of arrival-time difference of arrival (AOA-TDOA) technique to determine the geolocation of each of the one or more emitters;
    wherein said second processor utilizes a Dirichlet process mixture model (DPMM) technique to determine an actual number of emitters comprising the one or more emitters.

2. The geolocation system as claimed in claim 1, wherein the first processor includes a digital signal processor (DSP), and the second processor includes a general purpose processor (GPP).

3. The geolocation system as claimed in claim 1, wherein each of said sensors comprises an antenna array configured to receive signals in the multi-path environment.

4. The geolocation system as claimed in claim 1, wherein each of said sensor comprises a transceiver configured to transmit the clustered data to the central node.

5. The geolocation system as claimed in claim 1, wherein said central node and said cognitive sensor activation unit are connected to a graphical user interface.

6. A method for providing geolocation information in a multi-path environment comprising the steps of:
    receiving a mixture of signals from one or more emitters at one or more sensors in said multi-path environment;
    determining angle of arrival (AOA) and time of arrival (TOA) data from each of the received signals in said multi-path environment;
    clustering the mixture of received signals based on the determined AOA and TOA data into one or more clusters arising from one or more emitters utilizing a non-parametric Bayesian technique;
    transmitting by the one or more sensors the one or more clusters to a central node for further processing;
    estimating by the central node the time difference of arrival (TDOA) profile for each of the one or more emitters based on the one or more clusters and extracting the AOA data for said emitters from within the distinct one or more clusters;
    processing by the central node the AOA data and TDOA profile data for each of the one or more emitters to perform a hybrid AOA-TDOA technique for determining the geolocation of the one or more emitters;
    wherein the central node further utilizes a Dirichlet process mixture model (DPMM) technique to determine an actual number of emitters comprising the one or more emitters; and
    selectively activating the one or more sensors to detect the corresponding one or more emitters based on the determined geolocation of the one or more emitters.

7. The method as claimed in claim 6, comprising displaying geolocation data on a graphical user interface.

8. A method for selectively activating one or more sensors for tracking one or more emitters in a multi-path environment, comprising the steps of:
receiving signals from one or more emitters at one or more sensors in said multi-path environment;
determining angle of arrival (AOA) and time of arrival (TOA) from each of the received signals in said multi-path environment;
clustering into clusters the mixture of received signals arising from one or more emitters utilizing a non-parametric Bayesian technique;
transmitting by the one or more sensors said clusters to a central node for further processing;
estimating by the central node the time difference of arrival (TDOA) profile for each of the one or more emitters and extracting the AOA data for said emitters from within the distinct clusters;
processing by the central node the TDOA profile and AOA data information for each of the one or more emitters to perform a hybrid AOA-TDOA technique for determining the geolocation of the one or more emitters, wherein the central node further utilizes a Dirichlet process mixture model (DPMM) technique to determine an actual number of emitters comprising the one or more emitters;
tracking the position and a next time instant position of each of the emitters based on said geolocation of the one or more emitters; and
selectively activating the one or more sensors in proximity to one or more emitters based on the determined geolocation and next time instant position of the one or more emitters.

9. The method as claimed in claim 8, further comprising discretizing the multi-path environment into Voronoi regions based on each sensor being located at a center of a corresponding Voronoi region; wherein selectively activating the one or more sensors includes activating the one or more sensors based on the Voronoi region discretization.

10. The method as claimed in claim 8, wherein selectively activating the one or more sensors in proximity to a targeted emitter reduces the sensor transmission power and noise contributions.

* * * * *